Dec. 23, 1952  J. PINSKY  2,622,656
ELECTRIC TAPE
Filed June 29, 1948

INVENTOR
JULES PINSKY

BY Parham + Bates

ATTORNEYS

Patented Dec. 23, 1952

2,622,656

UNITED STATES PATENT OFFICE 2,622,656

ELECTRIC TAPE

Jules Pinsky, West Hartford, Conn., assignor to Plax Corporation, West Hartford, Conn., a corporation of Delaware Application June 29, 1948, Serial No. 35,760

6 Claims. (Cl. 154—2.6)

This invention relates to improvements in electrical tape, patching material for rubber goods and the like, and particularly those materials having a layer of live rubber, either with or without an adhesive coating, which require an intimately attached protective covering, that may be removed before application of the live rubber tape or patching material to spliced electrical conductors, injured rubber goods or the like.

Heretofore, tape and patches of this type have been made employing a removable protective covering of holland or similarly treated inelastic fabric having a greater tensile strength than the tape or patching material. It also has been suggested that the cover sheet comprise a flexible material or composition such as "Cellophane" or allied cellulose, collodion, pyroxylin or other substance in sheet form having an adhesive affinity for the live rubber or the interposed layer of adhesive.

The separation of a desired length of this type of protected tape from a roll or other source of supply and the removal of the protective covering from the selected length of the tape are not easily accomplished. Considerable difficulty has been experienced in ripping or tearing holland along a thread line extending transversely of the live rubber tape and in severing the composite tape without excessively stretching it. Similar disadvantages have been experienced with tape and patches protected by regenerated cellulose and the like.

One suggestion for facilitating the removal of the protective covering is to score the covering, either before or after application to the protected material, so as to provide lines of diminished tensile strength along which the covering more easily may be ripped or ruptured.

It is an object of the present invention to provide an improved tape or patch construction which provides for the ready fracture of the protective covering along any desired line extending in a predetermined direction and not merely along arbitrarily spaced lines of diminished tensile strength.

Another object is to provide in a temporarily reinforced and protected tape of this type means for facilitating the severance of the protected tape, or sheet of patching material, along a desired line without excessive distortion of the tape or sheet.

A further object is to provide a live rubber tape or the like protected by an adhering coextensive strip having a low transverse flexure strength which may be removed readily from the tape.

Other objects and advantages of the invention are disclosed or will be apparent from the embodiment of the invention hereinafter described with reference to the accompanying drawing in which.

Figure 1:
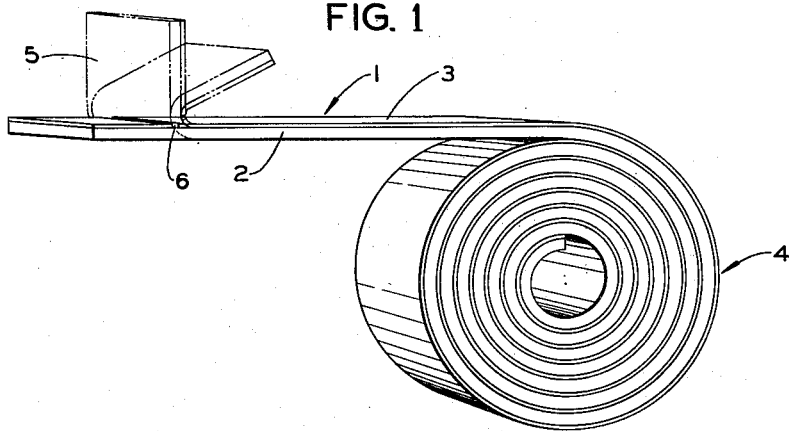
Figure 1 is a perspective view of a roll of protected tape comprising a layer of live rubber tape and a coextensive protective strip, the thickness of which is exaggerated somewhat for clarity.
Figure 2:
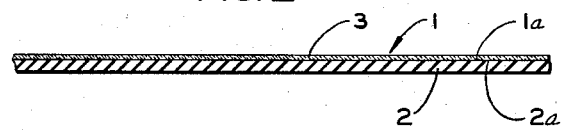
Figure 2 is a cross-sectional view of a length of composite or laminated tape shown in Figure 1.

The composite tape, generally designated by the numeral 1 in the drawings, comprises an inner or bottom layer of live rubber tape 2 which may be secured either with or without an adhesive coating to an upper or outer strip 3 which provides an inelastic removable protective cover for the underlying live rubber tape 2. The adjacent surfaces 2a and 3a of the respective layers 2 and 1 preferably are rolled or otherwise pressed into close surface engagement as is customary in laminated tape of this general character.

As illustrated in Fig. 1, a length of the composite tape 1 may be supplied in rolled form 4, preferably with the protected strip 3 forming the outer surface of the roll, although it will be understood that the live rubber tape 2 may provide the outer surface for the roll 4. It also will be understood that the laminated product consisting of the live rubber layer 2 and the protective layer 3 may be supplied in flat sheets of varied sizes rather than rolled as at 4.

In accordance with the present invention, the outer or protective strip 3 shown in the drawings is formed of a plastic material which is molecularly oriented in a transverse direction.

Methods of introducing molecular orientation into plastic materials are well known. One such method involves stretching the material while in a heated plastic condition in the direction or directions in which molecular orientation is desired and thereafter cooling the material to a non-plastic condition before the orientation stresses have time in which to relax at the elevated or plastic temperature and while restraining the material in its stretched condition. In this manner, molecular orientation may be introduced in the one or more directions depending upon the number of directions in which the material is stretched.

It will be understood that the manner in which molecular orientation is introduced into the protective strip 3 does not constitute a part of this invention, the foregoing description being given merely as illustrative of what is well known in the plastic art. For a more detailed disclosure of method and apparatus for producing molecularly oriented sheet, reference may be made to the U. S. Patent No. 2,412,187, issued December 3, 1946, to Wiley et al.

While the strip 3 may be formed of a variety of molecularly orientable plastic materials such as, for example, methyl methacrylate and polyethylene, polystyrene has been found particularly suitable because of its ready adaptability to molecular orientation and also because of its low flexure strength along its lines of maximum orientation. Polystyrene tape 3 up to ten mils thick which has been molecularly oriented between two and six times its unoriented length, may be readily bent or coiled about a half inch or greater radius and, at the same time, has a sufficiently low flexure strength so that it readily fractures when bent double.

In accordance with the present invention, the maximum molecular orientation of the polystyrene strip 3 is uniformly distributed transversely of the strip which extends at right angles to the transverse or lateral lines of maximum orientation. While the strip 3 preferably contains some longitudinal molecular orientation, it should be understood that longitudinal orientation is not required by the present invention. It also should be understood that the transverse orientation required by the invention may extend in a direction obliquely rather than at right angles to the longitudinal edges of the tape. This transverse molecular orientation provides an infinite number of parallel adjacent lines of weakness or potential fracture in the strip 3 which preferably is uniformly thick and homogeneous at all points throughout its length.

A further advantage of polystyrene is that it may be provided in transversely oriented strips containing little or no exudable plasticizers or other violatible materials, the loss of which might result in deterioration of the polystyrene and the presence of which might cause deterioration of the live rubber tape 2 or any adhesive therebetween.

Figure 3:
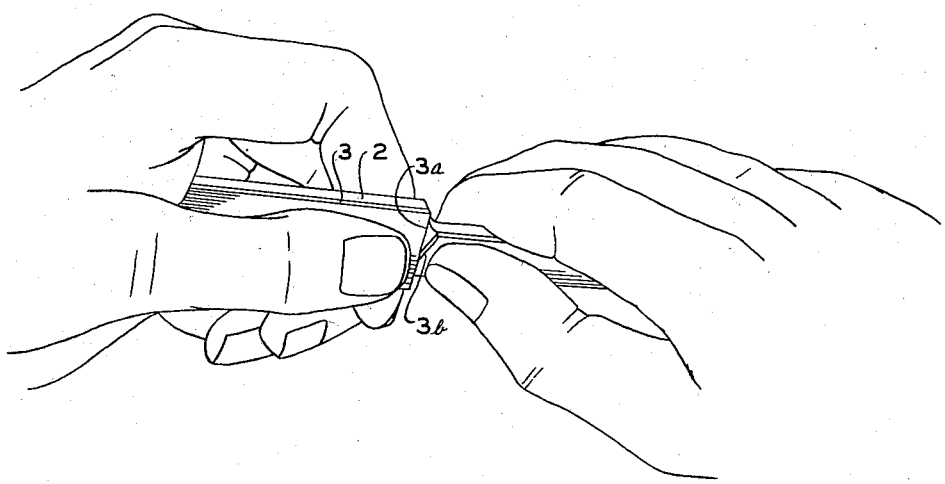
Figure 3 is a perspective view showing the manner in which the live rubber portion of the tape readily may be severed against a cutting edge formed by fracture of the protective strip portion of the tape.

In addition, polystyrene has an advantage in relatively thick cross-section, i. e., of the order of seven mils or greater, in that it provides a sharp edge at its fracture with which to cut the live rubber tape 2 in a manner which will be described hereinafter with reference to Fig. 3.

A desired length of the composite or laminated tape 1 may be removed from the roll 4 by a succession of simple operations. First, the tape 1 is bent along a transverse line which will provide the desired or selected length 5 of tape. The initial bend may be made with the live rubber tape 2 on the inside, although it has been found that fracture of the protected strip 3 at the bend is obtained more readily by bending the tape 1 with the protective strip 3 on the inside and the live rubber strip 2 on the outside, as shown in Fig. 1.

Normally a single acute bend serves to break the strip 3. Where because of insufficient transverse orientation or other reason a single bend does not break the strip 3, flexing along the initial bend line accomplishes the fracture. Thereafter, because of the absence of reinforcement, the live rubber tape 2 may be ripped or pulled apart at the break 6 in the reinforcing strip 3. The breaking of the protective strip 3 and the subsequent rupturing of the live rubber tape 2 each start the separation of the adhering surfaces 2a and 3a sufficiently so that the ruptured edges may be gripped by the fingers and the protective covering pulled from the severed length 5 of the live rubber tape.

As hereinbefore indicated, where the protective polystyrene strip 3 is of seven mils thickness or greater, sharp rigid edges 3a and 3b are created at the fracture 6 which may be used as cutting edges along which to sever the live rubber tape 2. Severance may be accomplished manually by gripping the tape 1 closely adjacent the edges 3a and 3b and drawing the live rubber 2 firmly against one of the edges 3a or 3b with a slight twisting action substantially as shown in Fig. 3. The severance of the tape 2 is effected with a minimum of stretching and deformation and without the use of auxiliary cutting tools.

The presence of longitudinal as well as lateral or transverse molecular orientation is desirable, particularly in the backing strip 3 of wide tape so that a length of the strip may be fractured longitudinally and the adhering live rubber tape torn against the fracture edge of the protective strip into desired widths.

Having thus described my invention, I claim:

1. Electric tape formed of live rubber and having a coextensive strip of transversely molecularly oriented polystyrene adhesively and removably secured thereto, the width of the transversely molecularly oriented strip being at least twice its unoriented width and the tape and coextensive strip being coilable around approximately a half inch radius without fracture, said plastic strip being sufficiently brittle to fracture in a straight line when bent approximately double along any line extending transversely thereof in the direction of said transverse molecular orientation.

2. Electric tape as recited in claim 1 and wherein transverse fracture of said oriented material provides a sharp straight edge having sufficient rigidity to cut the live rubber strip adjacent thereto.

3. Electric tape as recited in claim 1 wherein the polystyrene strip is oriented in the transverse direction only.

4. Electric tape as recited in claim 3 wherein the polystyrene tape is at least seven mils thick.

5. An article of manufacture including a sheet of live rubber having an adhesive surface protected by a temporary removably adhering sheet of polystyrene which is of the order of 7 mils thickness and which is molecularly oriented in only one dimensional direction of the surface of the sheet and between two and six times its unoriented length, said polystyrene sheet being uniformly brittle and readily fracturable along any line paralleling the said dimensional direction when bent double on such a line and being coilable without fracture about approximately a half inch radius around an axis paralleling the direction of orientation.

6. An article of manufacture comprising a tape of live rubber having an adhesive surface, and a polystyrene strip of uniform thickness which is substantially uniformly molecularly oriented in the transverse direction only, said polystyrene strip being uniformly brittle and readily fracturable in clean, sharp, rigid edges when bent double along any line paralleling the direction of orientation and being flexible and less brittle along lines angularly disposed relative to the direction of orientation, said polystyrene strip removably adhering to and protecting said pressure-sensitive adhesive surface and wherein said live rubber tape is transversely severable by pulling and cutting it against one of said sharp transverse edges produced by bending and fracture.

JULES PINSKY.

REFERENCES CITED

The following references are of record in the file of this patent:

UNITED STATES PATENTS

| Number | Name | Date |
| --- | --- | --- |
| 2,047,497 | Studt | July 14, 1936 |
| 2,185,789 | Jacque | Jan. 2, 1940 |
| 2,257,139 | Tone | Sept. 30, 1941 |
| 2,259,347 | Mallory | Oct. 14, 1941 |
| 2,319,272 | Starr | May 18, 1943 |
| 2,393,006 | Vincent | Jan. 15, 1946 |
| 2,395,668 | Kellgren | Feb. 26, 1946 |
| 2,429,340 | Bailey | Oct. 21, 1947 |
| 2,439,481 | Martin | Apr. 13, 1948 |
| 2,541,498 | Calvert | Feb. 13, 1951 |